UNITED STATES PATENT OFFICE.

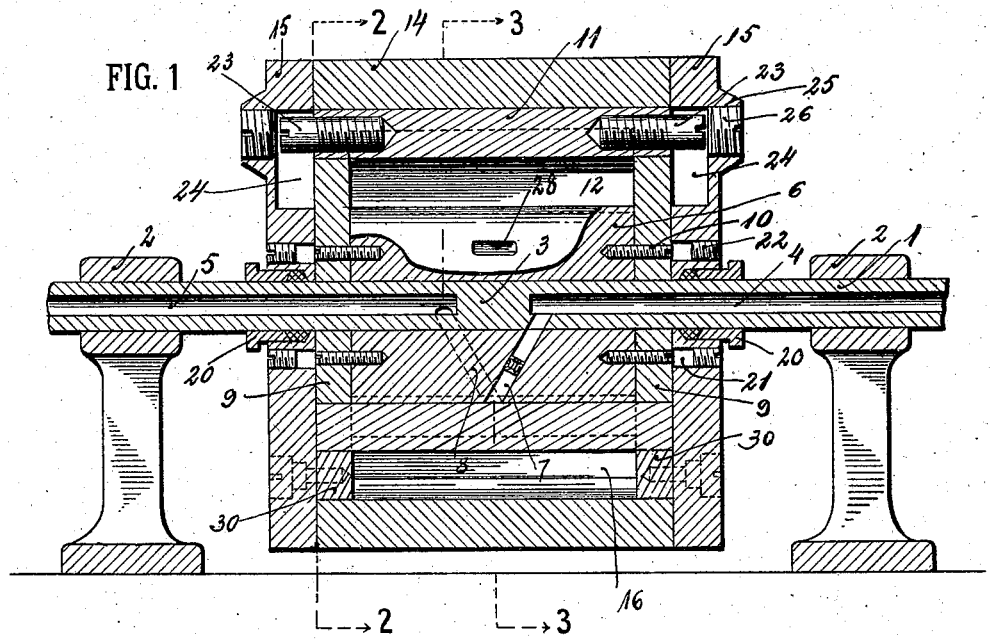

HENRY A. SEITZ, OF BROOKLYN, NEW YORK, ASSIGNOR OF ONE-HALF TO GEORGE ISAACS, OF NEW YORK, N. Y.

ROTARY ENGINE.

No. 854,849.     Specification of Letters Patent.     Patented May 28, 1907.

Application filed October 29, 1906. Serial No. 341,021.

*To all whom it may concern:*

Be it known that I, HENRY A. SEITZ, a subject of the German Emperor, and a resident of Brooklyn, county of Kings, State of New York, have invented certain new and useful Improvements in Rotary Engines, of which the following is a specification.

The present invention particularly relates to that class of rotary engines specified in the Patent No. 766,696 of August 2nd, 1904, and has for its object to simplify the construction shown therein.

This invention also has for its object to arrange the machine so that it can be used either as steam engine or other pressure fluid engine, or high pressure pump, or air compressor.

My invention will be more fully understood from the accompanying drawing in which similar reference letters denote corresponding parts and in which Figure 1 is a vertical longitudinal section of the rotary engine; Fig. 2 a cross section on line 2—2 of Fig. 1, and Fig. 3 a cross section on line 3—3 of Fig. 1.

1 represents a hollow shaft or axle which according to the use of the machine as steam engine, or compressor may be mounted in its bearings 2, 2 stationary or rotatively. Similar to the construction shown in the above named patent the bore of the hollow shaft is divided by a central partition 3 into inlet and exhaust passages 4, 5 for steam or other pressure fluid and the opposite ends of the shaft may be suitably formed for its connection with supply and discharge or exhaust pipes (not shown in the drawing). Mounted on the said hollow shaft is a solid cylinder 6 that is provided with supply and exhaust ducts 7, 8 leading to the periphery thereof from the supply and exhaust passages 4, 5 of the hollow shaft. At each end of the cylinder 6 a circular disk 9 is borne on the hollow shaft 1 and adapted to rest in close contact with the respective side surface of the cylinder 6. Normally, *i. e.* when the machine is used as steam engine, or engine driven by any other pressure fluid, the said disks are secured to the cylinder 6 by screw bolts 10 or by any other suitable means that will allow of their being readily detached from the cylinder. The diameter of the said disks 9, 9 is somewhat larger than that of the solid cylinder 6. The disks 9, 9 are eccentrically borne on the shaft 1 in such a manner that at one point the periphery thereof will be level with that of the cylinder 6.

Rotatively mounted on the disks 9, 9 is an annular cylinder 11 that at the point where the periphery of the disks is level with that of the cylinder 6 will embrace the latter, and from this point will form a free space 12 between itself and the cylinder 6, which space in accordance with the eccentricity of the disks will gradually increase in its width. The ring 11 is provided with a plurality of radially extending paddles 13 slidably secured therein, and extending throughout the entire length of the free space 12 that is equal to that of the cylinder 6. These paddles are adapted laterally to bear tightly against the inner surface of the eccentric disks 9, and to project through the free space 12 onto the cylinder 6 to also bear tightly against the circumference of the latter. The outer casing 14 is concentrically mounted to bear on the annular cylinder 11 and has two heads or disks 15, 15 that are tightly and removably secured thereto. Owing to the eccentrical position of the ring 11 a free space 16 similar to space 12 is also formed between said ring and the said outer casing 14. The outer ends of the paddles 13 are adapted to project also through the free space 16 and to tightly bear against the inner surface of the said outer casing 14. This free space 16 is designed for the purpose of allowing the machine being utilized as high pressure pump or air compressor as will be hereafter more fully specified. In this latter case, special supply and discharge passages 17, 18 are provided in the outer casing adjacent to the point at which the latter bears on the ring 11. These passages are adapted to be closed by plugs 19, 19 when the machine is used as steam engine or the like.

The lateral disks or heads 15, 15 are rotatively borne on the shaft 1 by ordinary packing boxes 20, 20 and are provided with bores 21, 21 registering with the screw bolts 10. Said bores that are normally closed by plugs 22 have the object to permit of the insertion of a proper tool for uncoupling the eccentric disks 9, 9 from the cylinder 6 when it is desired to use the machine as compressor or the like.

The ring 11 is adapted to extend throughout the entire length of the outer casing and is normally coupled with the latter by lateral pivots 23, 23 removably secured therein and engaging into oblong recesses or grooves 24, 24 provided on the inner surface of the heads 15, 15 the length of said grooves corresponding with the eccentricity of disks 9 or ring 11. Registering with the pivots or screw bolts 23, 23 are bores 25, 25 in the heads 15, 15 that normally are closed by plugs 26, 26 and that have the object to allow of the removal of the pivots 23, 23 when it is desired to uncouple the outer casing from the ring 11 and to use the machine as compressor or the like. For the latter case, I also provide means for coupling the ring 11 with the inner cylinder 6, which consists in a plug 27 slidably arranged in one of the paddles 13 and adapted to engage into a corresponding groove 28 in the circumference of the cylinder 6. Normally the plug does not project outward from within the paddle, but when the machine is to be used as compressor or the like, the same can be brought into engagement with the groove 28 by a suitable tool to be inserted through a bore 29 in the outer casing 14. The free space between the latter and the ring 11, is laterally closed by correspondingly shaped rings 30, 30 that are adapted to tightly bear around the ring 11 and against the lateral edges of the paddles 13 and that are removably secured to the inner surface of the heads 15, 15.

To diminish the friction between the revolving and stationary parts, these rings 30, 30 need not be applied when the machine is to be used as steam engine or the like, i. e. when the supply and exhaust of the driving medium is accomplished through the then stationary shaft and when the medium operates in the free space 12. But when, in case of an air compressor or the like, the free space 16 is utilized, the rings 30, 30 must be applied.

The mode of operation is as follows: Assuming that the machine is to be used as steam engine, or engine driven by other pressure fluid, then the shaft 1 and cylinder 6 are stationary, the eccentric disks 9, 9 are coupled with the latter and the ring 11 is capable of revolving on the eccentric disks 9, 9 and is coupled with the outer casing 14 by the pivots 23, 23. The fluid is admitted through the supply passage 4 of the hollow shaft 1 and duct 7 into the free space 12. Operating upon the inner ends of the paddles 13 the fluid will drive the ring which will transmit its rotation to the outer casing, whence the power may be directly received. In case the machine is to work as high pressure pump or air compressor, the connection between eccentric disks 9, 9 and cylinder 6 and between ring 11 and outer casing 14 is cut off by removing the bolts or pivots 10 and 23 and instead, the ring 11 is coupled with cylinder 6 by the plug 27 brought into engagement with groove 28 in the cylinder 6. The free space 16 is laterally closed by the rings 30, 30. The plugs 19, 19 of the supply and exhaust passages 17, 18 in the outer casing 14 are removed and the fluid admitted into the free space 16. The fluid will then operate upon the outer ends of the paddles 13, whereby ring 11, cylinder 6, and shaft 1 will revolve, whereas the outer casing 14 will be stationary. Some suitable means may be provided for arresting the outer casing, when the inner parts only operate as in case the machine operates as air compressor or the like.

It will be understood that the various parts of my machine may be modified by anyone skilled in the art, without deviating from the spirit of my invention, and I therefore do not wish to restrict myself to the details of construction shown. But

What I claim and desire to secure by Letters Patent is:

1. The combination with a solid cylinder, of an annular cylinder mounted eccentrically to the said solid cylinder and forming a piston space between itself and the said solid cylinder, paddles carried by the said annular cylinder and adapted to work as pistons in the said space, means for supplying and exhausting fluid acting in the piston space, an outer casing loosely mounted on said annular cylinder and means for transmitting the rotation of the annular cylinder to the said casing, substantially as and for the purpose set forth.

2. The combination with a solid cylinder, of a hollow shaft on which the latter is borne, an annular cylinder mounted eccentrically to said solid cylinder and forming a piston space between itself and the latter, paddles carried by said annular cylinder, supply and exhaust ducts in the solid cylinder leading from the said hollow shaft for admitting and exhausting fluid to and from the piston space, an outer casing loosely mounted on the annular cylinder, and means for transmitting the rotation from the latter to the outer casing, substantially as and for the purpose set forth.

3. The combination with a solid cylinder, of a hollow shaft on which the latter is mounted, eccentrical disks borne on the hollow shaft, an annular cylinder loosely mounted on the said eccentrical disks and forming a piston space between itself and the solid cylinder, paddles carried by said annular cylinder and acting as pistons in the piston space, means for temporarily coupling the eccentrical disks with the solid cylinder, an outer casing loosely borne on the annular cylinder, means for transmitting rotation from the latter to the outer casing and means for admitting and exhausting fluid to and from the piston space, substantially as and for the purpose set forth.

4. The combination with a solid cylinder, of a hollow shaft on which the latter is borne, eccentrical disks at both sides of said cylinder, an annular cylinder mounted on said eccentrical disks, and forming a piston space between itself and the solid cylinder, an outer casing borne on the annular cylinder concentrically with the solid cylinder and forming a second piston space between itself and the annular cylinder, paddles carried by said annular cylinder and projecting with both ends through the said both piston spaces, means for admitting and exhausting fluid to and from either of said piston spaces, means for temporarily and alternatively coupling the annular cylinder with the outer casing and the solid cylinder, substantially as and for the purpose set forth.

Signed at New York this 27 day of October 1906.

HENRY A. SEITZ.

Witnesses:
CLARA SEITZ,
MAX I. ORDMANN.